US010918996B2

(12) United States Patent
Yamaguchi et al.

(10) Patent No.: US 10,918,996 B2
(45) Date of Patent: Feb. 16, 2021

(54) SPIRAL MEMBRANE ELEMENT

(71) Applicant: NITTO DENKO CORPORATION, Osaka (JP)

(72) Inventors: Taisuke Yamaguchi, Osaka (JP); Atsuko Mizuike, Osaka (JP); Masashi Echizen, Osaka (JP); Kazusa Matsui, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 481 days.

(21) Appl. No.: 15/512,960

(22) PCT Filed: Sep. 24, 2015

(86) PCT No.: PCT/JP2015/076955
§ 371 (c)(1),
(2) Date: Mar. 21, 2017

(87) PCT Pub. No.: WO2016/047696
PCT Pub. Date: Mar. 31, 2016

(65) Prior Publication Data
US 2017/0304775 A1 Oct. 26, 2017

(30) Foreign Application Priority Data
Sep. 25, 2014 (JP) .............................. JP2014-195000

(51) Int. Cl.
*B01D 63/10* (2006.01)
*B01D 69/10* (2006.01)
*B01D 69/12* (2006.01)

(52) U.S. Cl.
CPC ........... *B01D 63/10* (2013.01); *B01D 63/103* (2013.01); *B01D 69/10* (2013.01); *B01D 69/12* (2013.01);
(Continued)

(58) Field of Classification Search
CPC ...... B01D 63/10; B01D 63/103; B01D 69/10; B01D 2313/146; B01D 2325/04
See application file for complete search history.

(56) References Cited

U.S. PATENT DOCUMENTS 6,277,282 B1  8/2001  Kihara et al.
2009/0071903 A1  3/2009  Nakatsuji et al.
(Continued)

FOREIGN PATENT DOCUMENTS

CN  101325998 A  12/2008
CN  103338846 A  10/2013
(Continued)

OTHER PUBLICATIONS

Extended European Search Report issued in European Patent Office (EPO) Patent Application No. 15843980.2, dated May 28, 2018.
(Continued)

*Primary Examiner* — Angel Olivera
(74) *Attorney, Agent, or Firm* — Greenblum & Bernstein, P.L.C.

(57) ABSTRACT

The present invention provides a spiral membrane element in which the effective membrane area of a composite semi-permeable membrane can be increased and any decrease in rejection rate is less likely to occur. The spiral membrane element includes: a laminate including a permeation-side flow path material, a supply-side flow path material, and a composite semi-permeable membrane having a separation function layer on a surface of a porous support; a perforated central tube around which the laminate is wound; and a sealing member for preventing mixing between the supply-side flow path and a permeation-side flow path, the spiral membrane element being characterized in that the thickness of the porous support of the composite semi-permeable membrane is 80 μm to 100 μm, the permeation-side flow path material is formed from a tricot knit fabric, and the
(Continued)

width of a groove that continues in a straight line is 0.05 mm to 0.40 mm.

3 Claims, 4 Drawing Sheets

(52) U.S. Cl.
CPC .... *B01D 2313/146* (2013.01); *B01D 2325/04* (2013.01)

(56) References Cited

U.S. PATENT DOCUMENTS

| | | | |
|---|---|---|---|
| 2010/0006504 A1* | 1/2010 | Odaka | B01D 69/10 210/651 |
| 2013/0284664 A1 | 10/2013 | Takagi et al. | |
| 2013/0334128 A1* | 12/2013 | Takagi | B01D 63/103 210/457 |
| 2014/0014569 A1 | 1/2014 | Hirozawa et al. | |
| 2014/0231338 A1 | 8/2014 | Takaya et al. | |
| 2015/0068971 A1 | 3/2015 | Koiwa et al. | |

FOREIGN PATENT DOCUMENTS

| | | |
|---|---|---|
| CN | 103459003 A | 12/2013 |
| CN | 103987446 A | 8/2014 |
| EP | 2 002 880 | 12/2008 |
| JP | 60-19001 | 1/1985 |
| JP | 62-57609 | 3/1987 |
| JP | 9-276671 | 10/1997 |
| JP | 10-137558 | 5/1998 |
| JP | 2007-167783 | 7/2007 |
| WO | 2013/047398 | 4/2013 |

OTHER PUBLICATIONS

Office Action issued in Japan Counterpart Patent Appl. No. 2014-195000, dated May 30, 2018, along with an English translation thereof.
China Official Action received in 201580047468.9, dated Jan. 25, 2019.
Japan Official Action (Notification of Reasons of Refusal) received in 2014-195000, dated Jan. 29, 2019.
English translation of International Preliminary Report on Patentability, dated Apr. 6, 2017.
Search Report issued in International Bureau of WIPO Patent Application No. PCT/JP2015/076955, dated Dec. 8, 2015.
Office Action issued in Japan Counterpart Patent Appl. No. 2014-195000, dated Aug. 22, 2019, along with an English translation thereof.
Office Action issued in China Counterpart Patent Appl. No. 201580047468.9, dated Aug. 28, 2019, along with an English translation thereof.
Foreign Official Action issued in EP Patent Application No. 15843980.2, dated Mar. 2, 2020.
European Official Action issued in EP Appl. No. 15843980.2, dated Sep. 10, 2020.

* cited by examiner

SPIRAL MEMBRANE ELEMENT

TECHNICAL FIELD

The invention relates to a spiral membrane element (hereinafter also abbreviated as a "membrane element") having a composite semi-permeable membrane for separating and/or concentrating specific substances from a variety of liquids.

BACKGROUND ART

In recent years, an attempt to desalinate seawater has been made in the coastal big cities in arid or semi-arid areas where it is difficult to ensure water resources in a stable manner. Further, in areas poor in water resources such as China and Singapore, an attempt to purify industrial wastewater and domestic wastewater has been made for reusing the water. More recently, reuse of wastewater discharged from oilfield plants or the like has also been attempted by removing oils and salts from the oil-contaminated wastewater having high turbidity. A membrane method using a composite semi-permeable membrane has been found to be effective for such water treatment in terms of cost and efficiency.

Such water treatment processes often use a spiral membrane element, which includes, as shown in FIG. 1, a laminate including a composite semi-permeable membrane 2, a supply-side flow path material 6, and a permeation-side flow path material 3; a perforated central tube 5 on which the laminate is wound; and a sealing member 21 for preventing mixing between the supply-side flow path and the permeation-side flow path (see Patent Document 1). During the operation of the membrane element 1, a liquid 7 is supplied from one end of the membrane element 1. The supplied liquid 7 is allowed to flow along the supply-side flow path material 6 and in a direction parallel to the direction A1 of the axis of the central tube 5, and discharged as a concentrated liquid 9 from the other end of the membrane element 1. A permeated liquid 8 also passes through the composite semi-permeable membranes 2 during the process of allowing the supplied liquid 7 to flow along the supply-side flow path material 6. As indicated by the broken line arrow in the drawing, the permeated liquid 8 is allowed to flow along the permeation-side flow path material 3 and into the interior of the central tube 5 from perforations 5a, and discharged from the end of the central tube 5.

For example, as described in Patent Document 2, the conventional permeation-side flow path material for the spiral membrane element includes a tricot knit fabric that is impregnated with a resin so that its stiffness is increased taking into account the establishment of the permeation-side flow path, pressure loss, and other factors. This document also states that the width of grooves formed on the surface of the tricot knit fabric is preferably from 0.5 to 0.9 mm in order to reduce the pressure loss of the permeation-side flow path.

PRIOR ART DOCUMENTS

Patent Documents

Patent Document 1: JP-A-H10-137558
Patent Document 2: JP-A-S62-57609

SUMMARY OF THE INVENTION

Problems to be Solved by the Invention

However, it has been found that when a composite semi-permeable membrane thinner than conventional one is used in order to increase the effective membrane area in the process of forming a spiral membrane element, a conventional permeation-side flow path material, which is used in low-pressure spiral membrane element applications, can cause the composite semi-permeable membrane to be deformed in a large volume so that the rejection as a measure of membrane performance can decrease.

It is therefore an object of the invention to provide a spiral membrane element in which a composite semi-permeable membrane can have an increased effective membrane area and in which a composite semi-permeable membrane is less likely to cause a deformation-induced decrease in rejection.

Means for Solving the Problems

As a result of intensive studies on the relationship between a decrease in rejection and the structure of permeation-side flow path materials, the inventors have accomplished the invention based on the finding that using a specific tricot knit fabric as a permeation-side flow path material makes it possible to solve the problems even when a composite semi-permeable membrane thinner than conventional one is used.

Specifically, the invention is directed to a spiral membrane element including: a laminate including a composite semi-permeable membrane, a supply-side flow path material, and a permeation-side flow path material, wherein the composite semi-permeable membrane includes a porous support and a separation function layer on the surface of the porous support; a perforated central tube on which the laminate is wound; and a sealing member for preventing mixing between the supply-side flow path and the permeation-side flow path, wherein the porous support of the composite semi-permeable membrane has a thickness of 80 µm to 100 µm, and the permeation-side flow path material includes a tricot knit fabric having a continuous linear groove with a width of 0.05 mm to 0.40 mm.

In the spiral membrane element of the invention, the porous support of the composite semi-permeable membrane is thinner than conventional supports, which allows the composite semi-permeable membrane to have an increased effective membrane area in the membrane element and makes it possible to increase the permeate flow rate. In addition, the continuous linear groove has a width in the specified range, which can make the composite semi-permeable membrane resistant to the deformation-induced reduction in rejection even when the composite semi-permeable membrane is made thinner than conventional membranes.

In the invention, the permeation-side flow path material preferably has a thickness of 0.10 mm to 0.40 mm. The permeation-side flow path material with such a thickness can establish a sufficient permeation-side flow path and ensure that the composite semi-permeable membrane has a sufficient effective membrane area in the spiral membrane element.

In the spiral membrane element, the porous support preferably includes a nonwoven cloth layer with a thickness of 50 µm to 90 µm and a polymer porous layer with a thickness of 10 µm to 35 µm on one surface of the nonwoven cloth layer. Such a thickness relationship makes it possible to impart a suitable level of bending stiffness to the composite semi-permeable membrane with the total thickness kept in a certain range while the problem of defects in the porous support is made less likely to occur.

In addition, the permeation-side flow path material preferably includes a tricot knit fabric that is reinforced with a resin or fused after the knitting. When the stiffness of the tricot knit fabric is increased in this way, the permeation-side flow path material can establish a sufficient flow path.

The permeation-side flow path material is preferably wound in such a direction that the continuous linear groove is in a direction along the circumferential direction. Such placement of the permeation-side flow path material makes it possible to further reduce the pressure loss occurring when the permeate flows to the central tube.

MODE FOR CARRYING OUT THE INVENTION (Spiral Membrane Element)

Figure 1:
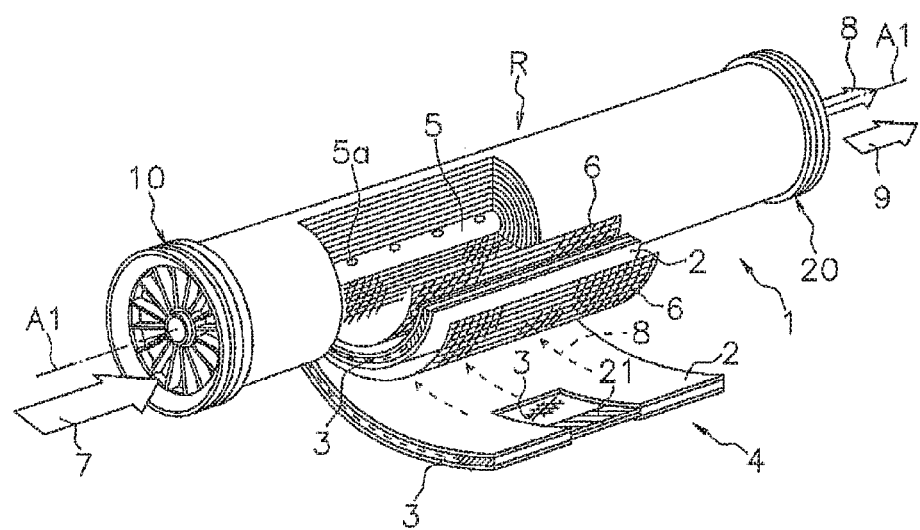
FIG. 1 is a partially-exploded perspective view showing an example of the spiral membrane element of the invention.

As shown in FIG. 1, the spiral membrane element of the invention includes a laminate including a composite semi-permeable membrane 2, a supply-side flow path material 6, and a permeation-side flow path material 3; a perforated central tube 5 on which the laminate is wound; and a sealing member 21 for preventing mixing between the supply-side flow path and the permeation-side flow path. In this embodiment, an example of a roll R is shown in which a plurality of separation membrane units each including the composite semi-permeable membrane 2, the supply-side flow path material 6, and the permeation-side flow path material 3 are wound around the central tube 5.

For example, an envelope-shaped membrane 4 (bag-shaped membrane) may be formed by placing the composite semi-permeable membranes 2 on both surfaces of the permeation-side flow path material 3 and bonding their three sides. In this case, the sealing member 21 for preventing mixing between the supply-side flow path and the permeation-side flow path is formed at an outer circumference end side, and the sealing members 21 are also formed at an upstream end side and a downstream end side, respectively. In addition, the sealing members 21 are also preferably formed between the central tube 5 and the inner circumference end of the upstream end side and between the central tube 5 and the inner circumference end of the downstream end side.

The roll R is formed by attaching the opening of the envelope-shaped membrane 4 to the central tube 5 and spirally wounding the envelope-shaped membrane 4 and the net-shaped (mesh-shaped) supply-side flow path material 6 on the outer surface of the central tube 5. For example, an upstream end member 10 such as a seal carrier is provided on the upstream side of the roll R, and optionally, a downstream end member 20 such as a telescope phenomenon-preventing member is provided on the downstream side of the roll R.

In general, about 20 to 30 sets of the envelope-shaped membrane 4 are wound in a conventional spiral composite membrane element with such a structure. In the invention, however, 30 to 40 sets of the envelope-shaped membrane 4 can be wound, because the composite semi-permeable membrane is thinner than the conventional membrane. It has been found that this makes it possible to increase the effective membrane area of the composite semi-permeable membranes and to achieve high throughput, so that the treatment efficiency can be significantly improved.

During the operation of the membrane element 1, a liquid 7 is supplied from one end of the membrane element 1. The supplied liquid 7 is allowed to flow along the supply-side flow path material 6 and in a direction parallel to the direction A1 of the axis of the central tube 5, and discharged as a concentrated liquid 9 from the other end of the membrane element 1. A permeated liquid 8 also passes through the composite semi-permeable membranes 2 during the process of allowing the supplied liquid 7 to flow along the supply-side flow path material 6. As indicated by the broken line arrow in the drawing, the permeated liquid 8 is allowed to flow along the permeation-side flow path material 3 and into the interior of the central tube 5 from perforations 5a, and discharged from the end of the central tube 5.

In general, the supply-side flow path material 6 has the function of ensuring a space enough to evenly supply the fluid over the membrane surface. The supply-side flow path material 6 with such a function may be, for example, a net, a knit fabric, or a concave-convex processed sheet. Any appropriate material with a maximum thickness of about 0.1 to about 3 mm may be used as needed. The supply-side flow path material 6 is preferably such that it has low pressure loss and can cause a moderate level of turbulent effect. In general, different flow path materials, such as the supply-side flow path material 6 on the supplied liquid side and the permeation-side flow path material 3 on the permeated liquid side, are placed on both surfaces of the separation membrane. The supply-side flow path material 6 should be a thick, large-mesh net-shaped flow path material whereas the permeation-side flow path material 3 should be a small-mesh, woven or knit fabric flow path material.

When a RO membrane or a NF membrane is used for seawater desalination, waste water treatment, or other applications, the supply-side flow path material 6 is placed inside the two-folded composite semi-permeable membrane. In general, the supply-side flow path material 6 used preferably has a network structure in which linear parts are arranged to form a lattice.

The material used to form the supply-side flow path material 6 may be, but not limited to, polyethylene or polypropylene. These resins may contain a microbicide or an antimicrobial agent. The thickness of the supply-side flow path material 6 is generally from 0.2 to 2.0 mm, preferably from 0.5 to 1.0 mm. If it is too thick, the amount of the membranes capable of being housed in the element can decrease, as well as the amount of permeation. Contrarily, if it is too thin, deposition of fouling materials can easily occur so that degradation of permeability can easily occur.

In the invention, particularly when the supply-side flow path material 6 with a thickness of 0.9 to 1.3 mm is combined with other components, the element can resist the deposition of fouling materials and also resist biofouling, so that the reduction of the flux can be suppressed even during continuous operation.

The central tube 12 may be any type of tube having perforations 12a in its circumference. Any conventional tube may be used as the central tube 12. In general, when the element is used for seawater desalination, wastewater treatment, or the like, the permeated water passing through the composite semi-permeable membranes 2 enters the central tube 12 from the perforations of the wall surface to form a permeate flow path. The central tube 12 generally has a length larger than the axial-direction length of the element. Alternatively, a structure of two or more segments joined together may also be used to form the central tube 12. The material used to form the central tube 12 may be, but not limited to, thermosetting resin or thermoplastic resin.

In the spiral membrane element of the invention, both ends of the roll R after resin sealing may be subjected to trimming or other processes for adjusting the length in the axial direction A1. If necessary, other components may be further provided, such as a perforated end member for preventing deformation (such as telescope phenomenon), a sealant, a reinforcement, and an exterior material.

The spiral membrane element of the invention described above has the feature that the composite semi-permeable membrane includes a porous support with a thickness of 80 to 100 μm and a separation function layer on the surface of the porous support and the permeation-side flow path material is made of a tricot knit fabric having continuous linear grooves with a width of 0.05 to 0.40 mm. Hereinafter, the composite semi-permeable membrane and the permeation-side flow path material will be described in detail.

(Permeation-Side Flow Path Material)

When a RO membrane or a NF membrane is used for seawater desalination, wastewater treatment, or other applications, the permeation-side flow path material is placed on the outer surface of the two-folded composite semi-permeable membrane. The permeation-side flow path material is required to support the membrane from its backside against the pressure applied to the membrane, and also required to establish the flow path for the permeated liquid.

Figure 2:
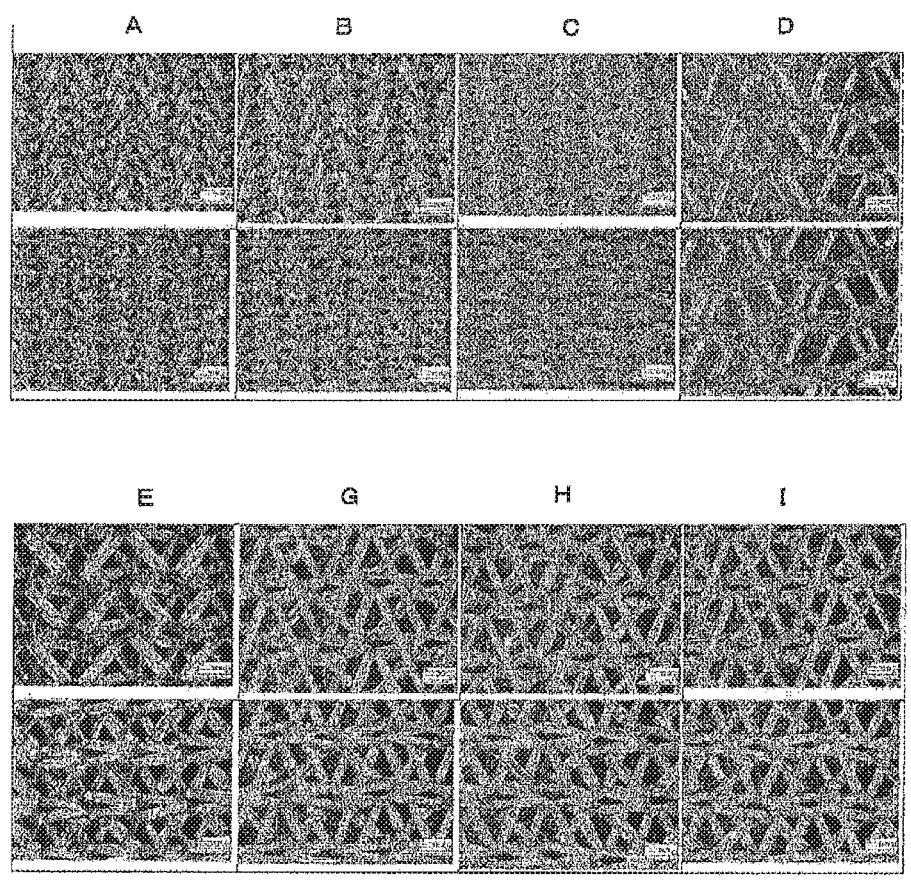
FIG. 2 is a microscope photograph of permeation-side flow path materials A, B, C, D, E, F, G, H, and I used in examples and comparative examples, in which the surface on which continuous linear grooves are formed is shown on the lower side while the non-grooved surface is shown on the upper side.

In the invention, the permeation-side flow path material is made of a tricot knit fabric as shown in FIG. 2 so that these functions can be ensured. The permeation-side flow path material is preferably made of a tricot knit fabric that is reinforced with a resin or fused after the knitting.

The permeation-side flow path material may be made of yarns of polyester such as polyethylene terephthalate or polyethylene naphthalate or polyolefin such as polyethylene or polypropylene. Especially in view of workability and productivity, polyethylene terephthalate is in particular preferably used.

When reinforcement with a resin is performed after the knitting, the reinforcement method may include, for example, impregnating the fibers with a resin and curing the resin or coating the surface of the fibers with a resin and curing the resin. The resin for use in the reinforcement may be, for example, a melamine resin or an epoxy resin.

The permeation-side flow path material may be made of monofilament or multifilament yarns. The tricot knit fabric should be made of yarns with a constant thickness. Among tricot knit fabrics, cord knitting fabrics are preferred, having a clear structure of continuous linear grooves.

The permeation-side flow path material has preferably a thickness of 0.10 to 0.40 mm, more preferably 0.15 to 0.35 mm, even more preferably 0.20 to 0.30 mm. If the thickness is less than 0.10 mm, a problem may occur in that it will be difficult to establish a sufficient flow path and the pressure loss of the permeated liquid will be high. If the thickness is more than 0.40 mm, a problem may occur in that the composite semi-permeable membrane will have a reduced effective membrane area in the membrane element and the flow rate of the permeated liquid will decrease. In order to form a tricot knit fabric with the specified thickness, the yarns for forming the permeation-side flow path material preferably have a thickness of 0.1 to 0.15 mm.

In the invention, the continuous linear groove or grooves in the tricot knit fabric have a width of 0.05 to 0.40 mm, preferably 0.10 to 0.28 mm, more preferably 0.15 to 0.25 mm. If the groove width is less than 0.05 mm, a problem can occur in that the pressure loss of the permeated liquid will be too high. If the groove width is more than 0.40 mm, the rejection of the composite semi-permeable membrane can easily decrease as the membrane is deformed.

In this regard, the width of the continuous linear groove in the tricot knit fabric refers to the average of the widths of the widest and narrowest parts of adjacent loops. In the examples, 10 averages are calculated from measurements of 10 pairs of loops in a microscope photograph, and then further averaged to calculate the width of the continuous groove.

In the membrane element, the permeation-side flow path material may be placed in any direction. Preferably, the permeation-side flow path material is wound in such a direction that the direction of the continuous linear groove is along the circumferential direction.

(Composite Semi-Permeable Membrane)

In the invention, the composite semi-permeable membrane includes a porous support and a separation function layer on the surface of the porous support. The porous support preferably includes a nonwoven cloth layer and a polymer porous layer on one surface of the nonwoven cloth layer. The composite semi-permeable membrane may have a thickness of about 80 to about 105 μm, preferably 85 to 100 μm.

The composite semi-permeable membrane with such features may be called a reverse osmosis (RO) membrane, a nanofiltration (NF) membrane, or a forward osmosis (FO) membrane depending on the filtration performance or the treatment method. The composite semi-permeable membrane with such features can be used for ultra-pure water production, seawater desalination, brackish water desalination, wastewater recycling, and other applications.

The separation function layer may be, for example, a polyamide-based, cellulose-based, polyester-based, or silicone-based separation function layer. The membrane preferably has a polyamide-based separation function layer. The polyamide-based separation function layer is generally a homogeneous film with no visible pores and has the desired ability to separate ions. The separation function layer may be any polyamide-based thin film resistant to delamination from the polymer porous layer. For example, there is well-known a polyamide-based separation function layer formed by subjecting a polyfunctional amine component and a polyfunctional acid halide component to interfacial polymerization on a porous support membrane.

Such a polyamide-based separation function layer is known to have a pleated microstructure. The thickness of the polyamide-based separation function layer may be, but not limited to, about 0.05 to about 2 μm, preferably 0.1 to 1 μm. It is known that if this layer is too thin, membrane surface defects will easily occur, and if it is too thick, permeability will decrease.

Any known method can be used for forming the polyamide-based separation function layer on the surface of the polymer porous layer without particular limitation. Examples of the method include an interfacial polymerization method, a phase separation method, and a thin film coating method, among which the interfacial polymerization method is especially preferably used in the present invention. The interfacial polymerization method is, for example, a method including coating the polymer porous layer with a polyfunctional amine component-containing aqueous amine solution, and bringing an organic solution containing a polyfunctional acid halide component into contact with the aqueous amine solution-coated surface, so that the interfacial polymerization occurs to form a skin layer. In this method, it is preferable to carry out the procedure by applying the aqueous amine solution and the organic solution to the polymer porous layer and removing the excess portion of these solutions as necessary. In this case, as a method for removing the excess solutions, there are preferably employed a method of flowing the excess solutions by tilting the membrane, a method of blowing a gas to the skin layer to remove the excess solutions, or a method of scraping the excess solutions off by bringing the skin layer into contact with a blade such as a rubber blade.

Further, in the above-mentioned step, the time until the aqueous amine solution comes into contact with the organic solution depends on the composition and viscosity of the aqueous amine solution as well as the size of pores in the surface of the porous support membrane, and the time is about 1 to 120 seconds, preferably about 2 to 40 seconds. When the interval is excessively long, the aqueous amine solution permeates and diffuses deeply inside the porous support membrane, and a large amount of an unreacted polyfunctional amine component may remain in the porous support membrane to cause problems. When the interval between the applications of the solutions is excessively short, too large an amount of an excess aqueous amine solution remains, which tends to deteriorate the membrane performance.

It is preferable that after the aqueous amine solution and the organic solution are brought into contact with each other, a skin layer is formed by heating and drying the solutions at 70° C. or higher. In this way, the mechanical strength and heat resistance of the membrane can be improved. The heating temperature is more preferably 70 to 200° C., particularly preferably 80 to 130° C. The heating time is preferably about 30 seconds to 10 minutes, more preferably about 40 seconds to 7 minutes.

The polyfunctional amine component contained in the aqueous amine solution is defined as a polyfunctional amine having two or more reactive amino groups, and includes aromatic, aliphatic, and alicyclic polyfunctional amines. The aromatic polyfunctional amines include, for example, m-phenylenediamine, p-phenylenediamine, o-phenylenediamine, 1,3,5-triamino benzene, 1,2,4-triamino benzene, 3,5-diaminobenzoic acid, 2,4-diaminotoluene, 2,6-diaminotoluene, N,N'-dimethyl-m-phenylenediamine, 2,4-diaminoanisole, amidol, xylylene diamine etc. The aliphatic polyfunctional amines include, for example, ethylenediamine, propylenediamine, tris(2-aminoethyl)amine, n-phenylethylenediamine, etc. The alicyclic polyfunctional amines include, for example, 1,3-diaminocyclohexane, 1,2-diaminocyclohexane, 1,4-diaminocyclohexane, piperazine, 2,5-dimethylpiperazine, 4-aminomethylpiperazine, etc. These polyfunctional amines may be used independently, and two or more kinds may be used in combination. In particular, in the present invention, it is preferable that the polyfunctional amine component is composed mainly of m-phenylenediamine capable of providing a highly dense separation function layer in the case where a high blocking rate is sought in the reverse osmosis membrane performance. Also, in the case where high flux retention rate is required in the NF membrane performance, it is preferable to use piperazine as a main component.

The polyfunctional-acid halide component contained in the organic solution is defined as a polyfunctional acid halide having two or more reactive carbonyl groups, and includes aromatic, aliphatic, and alicyclic polyfunctional acid halides. The aromatic polyfunctional acid halides include, for example trimesic acid trichloride, terephthalic acid dichloride, isophthalic acid dichloride, biphenyl dicarboxylic acid dichloride, naphthalene dicarboxylic acid dichloride, benzenetrisulfonic acid trichloride, benzenedisulfonic acid dichloride, chlorosulfonyl benzenedicarboxylic acid dichloride etc. The aliphatic polyfunctional acid halides include, for example, propanedicarboxylic acid dichloride, butane dicarboxylic acid dichloride, pentanedicarboxylic acid dichloride, propane tricarboxylic acid trichloride, butane tricarboxylic acid trichloride, pentane tricarboxylic acid trichloride, glutaryl halide, adipoyl halide etc. The alicyclic polyfunctional acid halides include, for example, cyclopropane tricarboxylic acid trichloride, cyclobutanetetracarboxylic acid tetrachloride, cyclopentane tricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, tetrahydrofuran dicarboxylic acid dichloride, etc. These polyfunctional acid halides may be used independently, and two or more kinds may be used in combination. In order to obtain a skin layer having higher salt-blocking property, it is preferred to use aromatic polyfunctional acid halides. In addition, it is preferred to forma cross linked structure using polyfunctional acid halides having trivalency or more as at least a part of the polyfunctional acid halide components.

In the interfacial polymerization method, although the concentration of the polyfunctional amine component in the aqueous amine solution is not in particular limited, the concentration is preferably 0.1 to 7% by weight, and more preferably 1 to 5% by weight. When the concentration of the polyfunctional amine component is too low, defects easily occur in the skin layer, and the salt-blocking performance tends to deteriorate. On the other hand, when the concentration of the polyfunctional amine component is too high, the skin layer is too thick, so that the permeation flux tends to decrease.

Although the concentration of the polyfunctional acid halide component in the organic solution is not in particular limited, it is preferably 0.01 to 5% by weight, and more preferably 0.05 to 3% by weight. When the concentration of the polyfunctional acid halide component is too low, an unreacted polyfunctional amine component is increased, and thus defects are likely to occur in the skin layer. On the other hand, if the concentration of the polyfunctional acid halide component is too high, an unreacted polyfunctional acid halide component is increased, and thus the permeation flux tends to decrease because the skin layer is too thick.

The organic solvents for containing the polyfunctional acid halide is not especially limited as long as they have small solubility to water, and do not cause degradation of the porous support, and dissolve the polyfunctional acid halide component. For example, the organic solvents include saturated hydrocarbons, such as cyclohexane, heptane, octane, and nonane, halogenated hydrocarbons, such as 1,1,2-trichlorofluoroethane, etc. They are preferably saturated hydrocarbons having a boiling point of 300° C. or less, and more preferably 200° C. or less.

Additives for the purpose of improving various properties and handling properties may be added to the aqueous amine solution or the organic solution. The additives include, for example, polymers, such as polyvinyl alcohol, polyvinylpyrrolidone, and polyacrylic acids etc.; polyhydric alcohols, such as sorbitol and glycerin; surfactants, such as sodium dodecylbenzenesulfonate, sodium dodecyl sulfate, and sodium lauryl sulfate; basic compounds, such as sodium hydroxide, trisodium phosphate, triethylamine, etc. for removing hydrogen halides formed by polymerization; acylation catalysts; compounds having a solubility parameter of 8 to 14 $(cal/cm^3)^{1/2}$ described in Japanese Patent Application Laid-Open No. 08-224452.

The exposed surface of the separation function layer may be provided with a coating layer made from various polymer components. The polymer component is not particularly limited as long as it is a polymer that does not dissolve the separation function layer and the porous support membrane and does not elute during the water treatment operation. Examples thereof include polyvinyl alcohol, polyvinylpyrrolidone, hydroxypropyl cellulose, polyethylene glycol, and saponified polyethylene-vinyl acetate copolymers. Among these, it is preferable to use polyvinyl alcohol, and particularly preferable to use polyvinyl alcohol having a saponification degree of 99% or more, or to use polyvinyl alcohol having a constitution that it is hardly eluted at the time of water treatment, which is formed by crosslinking polyvinyl alcohol having a saponification degree of 90% or more with the polyamide resin of the skin layer. By providing such a coating layer, the charge state of the membrane surface is adjusted and the hydrophilicity is imparted to the polyamide separation function layer. Therefore, it is possible to suppress the adhesion of contaminants, and to further enhance the flux retention effect by the synergistic effect of the present invention.

The nonwoven cloth layer used in the invention is not particularly limited as long as it imparts an appropriate mechanical strength to the composite semi-permeable membrane while maintaining the separation performance and permeability of the composite semi-permeable membrane, and it is possible to use a commercially available nonwoven cloth. As the material, those made from, for example, polyolefins, polyesters, cellulose, etc. are used, and a mixture of several materials can also be used. It is particularly preferable to use a polyester in terms of moldability. Further, it is possible to appropriately use a long-fiber nonwoven cloth and a short-fiber nonwoven cloth, but a long-fiber nonwoven cloth can be preferably used from the viewpoint of fine fluffing that causes pinhole defects or the uniformity of the membrane surface. In addition, air permeability of the nonwoven cloth layer itself in this case is not limited, but those having an air permeability of about 0.5 to 10 $cm^3/cm^2 \cdot s$, preferably about 1 to 5 $cm^3/cm^2 \cdot s$ can be preferably used.

The thickness of the nonwoven cloth layer is preferably 90 µm or less, more preferably 80 µm or less, even more preferably 70 µm or less. If the thickness is too large, the permeation resistance can be too high so that the flux can easily decrease. Contrarily, if it too small, the composite semi-permeable membrane support can have reduced mechanical strength, which will make it difficult to obtain a stable composite semi-permeable membrane. Therefore, the thickness of the nonwoven cloth layer is preferably 50 µm or more, more preferably 55 µm or more.

The polymer porous layer is not particularly limited as long as it can form the polyamide-based separation function layer, but is usually a microporous layer having a pore size of about 0.01 to 0.4 µm. Examples of the material for forming the microporous layer include various materials such as polysulfones, polyethersulfones (e.g. polyarylethersulfone), polyimides, and polyvinylidene fluoride. It is preferable to form a polymer porous layer using a polysulfone or a polyarylethersulfone, particularly from the viewpoint of chemical, mechanical, and thermal stabilities.

The thickness of the polymer porous layer is preferably 35 µm or less, more preferably 32 µm or less in the present invention. It was found that the flux retention rate after application of pressure is likely to decrease if the thickness of the polymer porous layer is too large. In addition, the thickness is particularly preferably 29 µm or less, most preferably 26 µm or less. It is possible to further enhance the stability of the flux retention rate by adjusting the thickness to such a low level. In addition, since defects are likely to occur if the polymer porous layer is too thin, the thickness is preferably 10 µm or more, more preferably 15 µm or more.

There is exemplified a production method when the polymer of the polymer porous layer is a polysulfone. In general, the polymer porous layer can be produced by a method called a wet process or a dry and wet process. It is possible to form a polymer porous layer on the nonwoven cloth through a solution preparation step of firstly dissolving a polysulfone and various additives in a solvent; a coating step of coating the surface of the nonwoven cloth with the solution; a drying step of causing microphase separation by evaporating the solvent in the solution; and a fixing step of immersing the nonwoven cloth in a coagulation bath such as a water bath. The thickness of the polymer porous layer can be set by adjusting the above solution concentration and the coating weight after calculating the ratio of the solution to be impregnated into the nonwoven cloth layer.

(Applications of the Spiral Membrane Element)

The spiral membrane element of the invention can be used for seawater desalination, wastewater treatment, and other applications. In recent years, composite semi-permeable membranes capable of providing a sufficient permeate flux even at a pressure lower than conventional pressures have been developed for the purpose of reducing the power consumption during the operation. In applications using such composite semi-permeable membranes, the differential pressure (operational pressure) between the supply and permeation sides of the membrane is set to, for example, 0.3 to 3.0 MPa, preferably 0.5 to 1.5 MPa. Even when the operation is performed at such a low pressure, the spiral membrane element of the invention can address the reduction in the thickness of the porous support by the use of a permeation-side flow path material with a higher density than conventional materials.

EXAMPLES

Hereinafter, the invention will be described in detail with reference to examples and comparative examples, which, however, are not intended to limit the invention. In each example, the physical properties and other properties were evaluated as described below.

(Thickness Measurement)

The thickness measurement was performed using a commercially available thickness measuring instrument (dial thickness gauge G-7C; manufactured by Ozaki Mfg Co., Ltd.). With respect to the thickness measurement of the nonwoven cloth layer and the polymer porous layer, the thickness of the nonwoven cloth layer was measured in advance, and the total thickness of the composite semi-permeable membrane support in a state where the polymer porous layer was laid on the nonwoven cloth layer was measured. Thereafter, a difference between the thicknesses of the composite semi-permeable membrane support and the thickness of the nonwoven cloth was obtained, and the difference was determined as the thickness of the polymer porous layer. In each thickness measurement, an average value of arbitrary ten-point measured values at the same membrane surface was used.

(Measurement of Groove Width and Yarn Diameter)

A microscope photograph of the permeation-side flow path material was taken, in which the groove width and the yarn diameter were each measured at any ten points based on the scale. The average of the ten measurements was used.

(Permeate Flux and Rejection)

A piece with the desired shape and size was cut from the prepared flat composite semi-permeable membrane. The cut piece and each of different permeation-side flow path materials were placed in a cell for flat membrane evaluation. An aqueous solution containing 2,000 mg/L of $MgSO_4$ and having an adjusted pH of 6.5 was brought into contact with the membrane at 25° C. under a differential pressure of 1.5 MPa between the supply and permeation sides of the membrane. After this operation was performed for 30 minutes, the permeation rate and conductivity of the resulting permeate water were measured, from which the permeate flux ($m^3/m^2 \cdot d$) and the $MgSO_4$ rejection (%) were calculated. The $MgSO_4$ rejection was calculated from the formula below using the correlation (calibration curve) between the $MgSO_4$ concentration and the conductivity of the aqueous solution, which was obtained in advance.

$MgSO_4$ rejection (%)={1−(the concentration of $MgSO_4$ in the permeated liquid)/(the concentration of $MgSO_4$ in the supplied liquid)}×100

The permeation-side flow path material was placed in such a manner that its surface having continuous linear grooves was in contact with the porous support of the composite semi-permeable membrane.

Production Example 1 (Production of Composite Semi-Permeable Membrane)

A long porous support (90 μm thick) was prepared by a process including continuously applying a solution of a mixture of polysulfone and dimethylformamide (polymer concentration 18.35% by weight) to the surface of a 65-μm-thick commercially available polyester nonwoven cloth (about 1 m wide) for a water treatment membrane support, while feeding the cloth, and then subjecting the applied solution to a coagulation treatment in water at 35° C. to form a 25-μm-thick polymer porous layer.

A solution A containing a mixture of 3.6% by weight of piperazine hexahydrate and 0.15% by weight of sodium lauryl sulfate was brought into contact with the surface of the polymer porous layer of the porous support, while the porous support was fed, and then the excess solution A was removed, so that a solution A coating layer was formed. Subsequently, a solution B containing 0.4% by weight of trimesic acid chloride in a hexane solvent was brought into contact with the surface of the solution A coating layer. The solution A coating layer and the solution B thereon were then subjected to drying in an environment at 120° C. to form a separation function layer, so that a long composite semi-permeable membrane was obtained.

Production Example 2 (Production of Composite Semi-Permeable Membrane)

A long composite semi-permeable membrane was produced under the same conditions as those in Production Example 1, except that the nonwoven cloth used had a thickness of 90 μm, the polymer porous layer was formed with a thickness of 40 μm, and the porous support obtained had a thickness of 130 μm.

Examples 1 to 5

Figure 3:
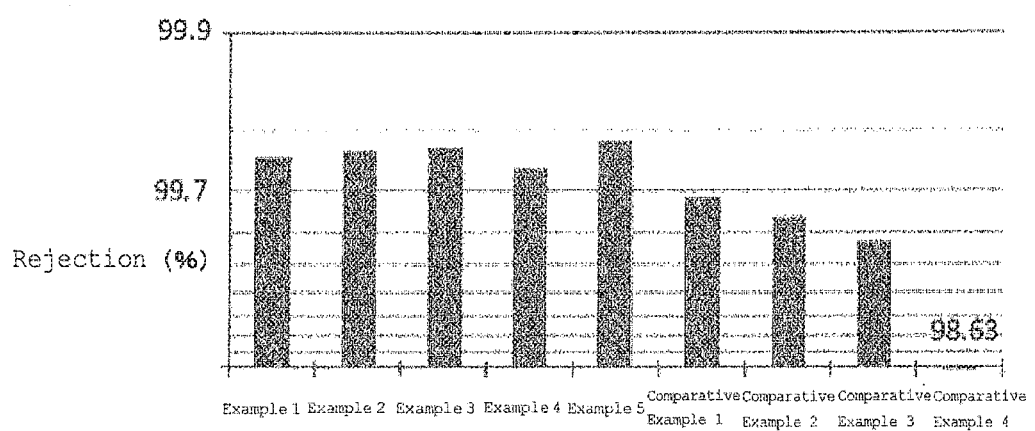
FIG. 3 is a graph showing the results of the rejection obtained in examples and comparative examples.
Figure 4:
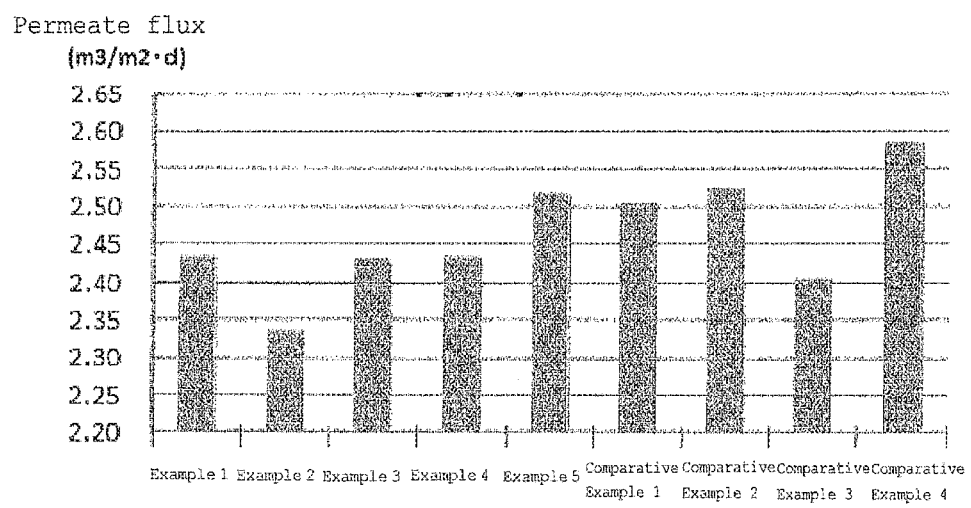
FIG. 4 is a graph showing the results of the permeate flux obtained in examples and comparative examples.

The permeate flux and the rejection were evaluated by the above method using the permeation-side flow path materials A to E shown in Table 1 and FIG. 2 and the composite semi-permeable membrane obtained in Production Example 1. The results are also shown in Table 1. The results are further graphed and shown in FIGS. 3 and 4.

Comparative Examples 1 to 4

The permeate flux and the rejection were evaluated by the above method using the permeation-side flow path materials F to I shown in Table 1 and FIG. 2 and the composite semi-permeable membrane obtained in Production Example 1. The results are also shown in Table 1. The results are further graphed and shown in FIGS. 3 and 4.

Reference Examples 1 to 9

The rejection was similarly evaluated by the above method using the permeation-side flow path materials A to I and the composite semi-permeable membrane obtained in Production Example 1, in which each permeation-side flow path material was placed in such a manner that its non-grooved surface opposite to its surface having continuous linear grooves was in contact with the porous support of the composite semi-permeable membrane. As a result, the rejection was 99.7% or more for every permeation-side flow path material used, and no reduction in rejection was observed.

The results of the examples and the comparative examples are shown in Table 1.

TABLE 1

| Permeation-side flow path material | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Symbol | A | B | C | D | E | F | G | H | I |
| Well | 60 | 60 | 60 | 38 | 37 | 34 | 33 | 33 | 33 |
| Knitting type | Tricot | Tricot | Tricot | Tricot | Tricot | Tricot | Tricot | Tricot | Tricot |
| Groove width (mm) | 0.17 | 0.13 | 0.07 | 0.38 | 0.38 | 0.46 | 0.42 | 0.42 | 0.42 |
| Thickness (mm) | 0.25 | 0.25 | 1.1 | 0.26 | 0.4 | 0.3 | 0.33 | 0.36 | 0.27 |
| Yarn diameter (mm) | 0.1 | 0.1 | 0.15 | 0.1 | 0.15 | 0.15 | 0.133 | 0.133 | 0.166 |
| Rejection ( ) | 99.75 | 99.76 | 99.77 | 99.74 | 99.78 | 99.68 | 99.63 | 99.57 | 98.63 |
| Permeate flux (m3/m2 · d) | 2.43 | 2.34 | 2.43 | 2.44 | 2.51 | 2.5 | 2.55 | 2.41 | 2.58 |

As shown in Table 1, the magnesium sulfate rejection was 99.7% or more in all of Examples 1 to 5 where the permeation-side flow path material used had continuous linear grooves with a width of 0.05 to 0.40 mm. Particularly, the permeate flux was more than 2.45 (m³/m²·d) in Example 5 where the permeation-side flow path material E was used. In contrast, a reduction in the magnesium sulfate rejection was found in Comparative Examples 1 to 4 where the permeation-side flow path material used had a groove width of more than 0.40 mm.

Comparative Example 5

The permeate flux and the rejection were evaluated under the same conditions as those in Example 1, except that the composite semi-permeable membrane (porous support thickness 130 μm) obtained in Production Example 2 was used instead of the composite semi-permeable membrane obtained in Production Example 1. As a result, the permeate flux and the rejection were 2.42 (m³/m²·d) and 99.74%, respectively, which were not different from those in Example 1, but the effective membrane area obtained when the composite semi-permeable membrane was loaded in the spiral membrane element was 16% smaller than that in Example 1, which was not preferred because of the reduction of the flow rate in the membrane element.

DESCRIPTION OF REFERENCE SIGNS

2 Composite semi-permeable membrane
3 Permeation-side flow path material
4 Envelope-shaped membrane
5 Central tube
6 Supply-side flow path material
7 Supplied water
8 Permeated water
9 Concentrated water
21 Sealing member

The invention claimed is:

1. A spiral membrane element comprising:
a laminate comprising a composite semi-permeable membrane, a supply-side flow path material, and a permeation-side flow path material, wherein the composite semi-permeable membrane comprises a porous support and a separation function layer on a surface of the porous support;
a perforated central tube on which the laminate is wound; and
a sealing member for preventing mixing between a supply-side flow path and a permeation-side flow path, wherein
the composite semi-permeable membrane is placed on both opposing surfaces of the permeation-side flow path material;
the porous support of the composite semi-permeable membrane has a thickness of 80 μm to 100 μm, and
the permeation-side flow path material comprises a tricot knit fabric having a continuous linear groove with a width of 0.05 mm to 0.25 mm;
wherein the porous support comprises a nonwoven cloth layer with a thickness of 50 μm to 90 μm and a polymer porous layer with a thickness of 10 μm to 35 μm on one surface of the nonwoven cloth layer.

2. The spiral membrane element according to claim 1, wherein the permeation-side flow path material comprises a tricot knit fabric that is reinforced with a resin or fused after knitting.

3. The spiral membrane element according to claim 1, wherein the permeation-side flow path material is wound in such a direction that the continuous linear groove is in a direction along a circumferential direction.

* * * * *